United States Patent Office 3,323,570
Patented June 6, 1967

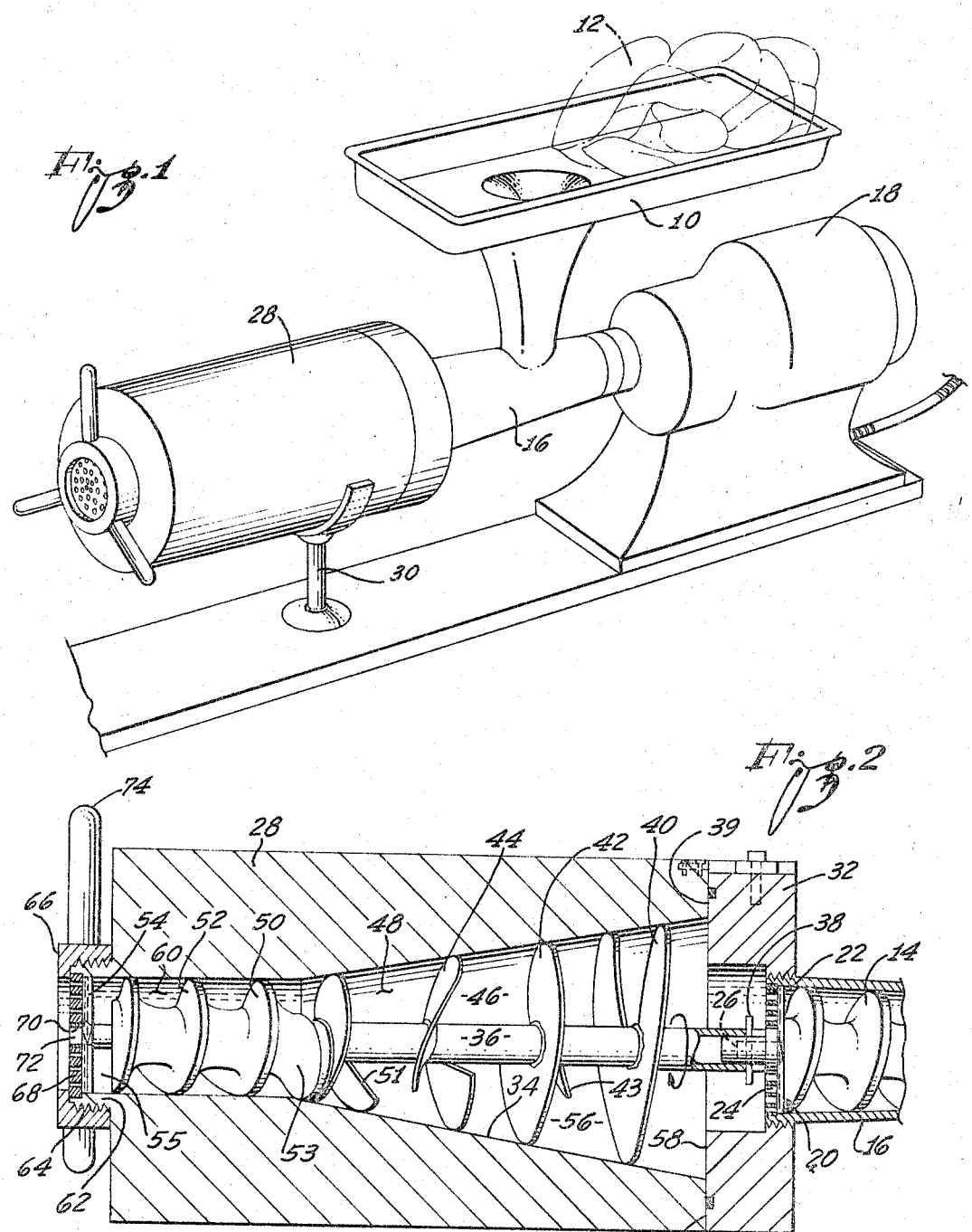

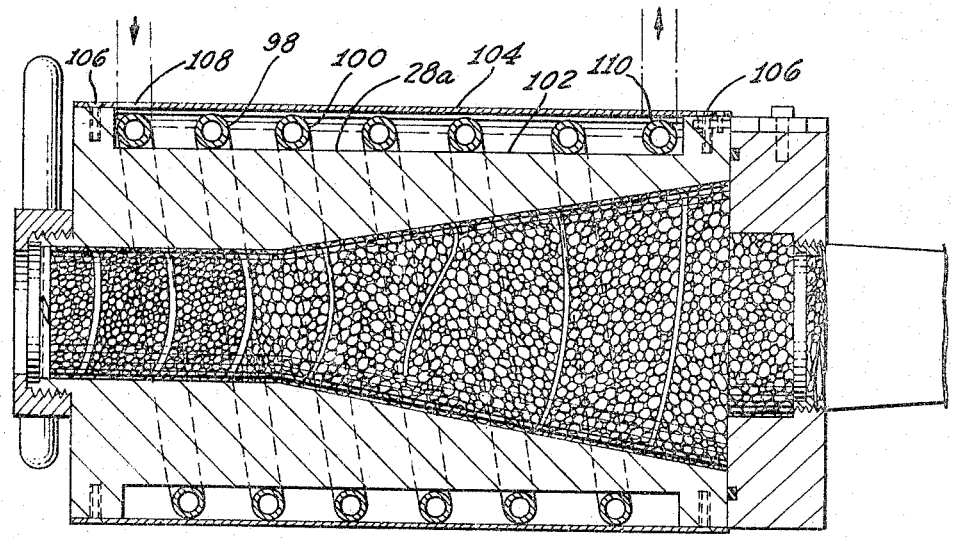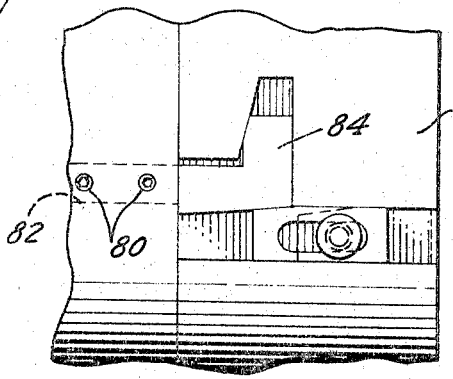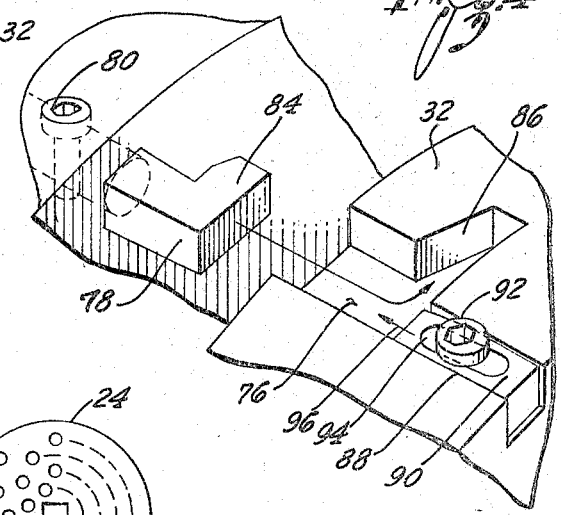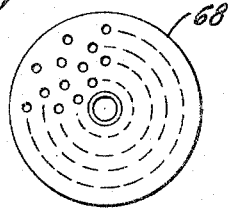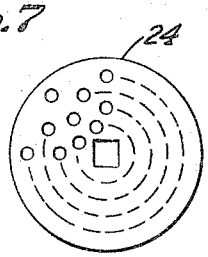

3,323,570
PLASTIC INGREDIENTS MIXING AND GRINDING ATTACHMENT
Nigral Ray Tullock, Betty Duff Tullock, and Dennis Ray Tullock, all of 439 23rd St., Santa Monica, Calif. 90402
Filed May 27, 1964, Ser. No. 370,567
5 Claims. (Cl. 146—186)

This invention relates to devices for grinding and mixing plastic elements into a relatively homogeneous conglomerate, and has particular application in a machine adapted to grind and mix meats, fats and other elements into hamburger, sausage, wursts and the like.

Ever since the advent of the screw type meat grinder it has been desired by those engaged in the butchering trade to provide means to be employed with such grinders whereby the finished meat conglomerate may be produced in one pass through the grinding machine. In the ordinary practice of making hamburger, sausage and wursts of various types, the several meat and fat elements are fed into the hopper of a motor driven grinder. In such grinders each element is compacted, cut and forced by the worm conveyer grinder past a rotating cutter blade and through the orifices of a perforated plate constituting the discharging end of the grinding machine. This produces ground-up batches of the separate elements in series corresponding generally to the order in which the several elements have been fed into the hopper of the grinder. The butcher or his assistant then takes the series of batches of the ground-up elements which have been thus discharged from the grinder and mixes them by hand for several minutes until a fair degree of homogeneity is obtained. The mixture is then reinserted into the hopper of the grinder and reground into the final meat product.

This conventional grinding-hand-mixing-and-grinding procedure takes as much as ten or fifteen minutes of time of relatively high priced labor, and since it is ordinarily repeated a number of times in the course of a day in a butcher shop to provide customers with freshly ground and mixed products, such procedure represents a substantial labor time loss to the average butcher shop.

The idea of providing an attachment for a motor-driven grinder whereby the meat and fat elements discharged through the perforated plate of the grinder may be mixed mechanically is not novel, as may be seen in various devices proposed in the following United States Letters Patents:

800,452, O. Kohn, Sept. 26, 1905; 865,095, G. L. Forrest, Sept. 3, 1907; 2,050,758, J. D. Long, Aug. 11, 1936; 2,200,786, O. R. Ardey May 14, 1940; 2,377,069, J. T. Brubaker, May 29, 1945; 2,633,170, L. H. Balmain, Mar. 31, 1953.

However, despite the teachings as to, and description of, the various devices proposed in these and possibly other patents, no grinding machine attachment for mixing meat and fat elements is currently offered to butchers by any of the major manufacturers of meat grinding machines such as Hobart Manufacturing Co. of Dayton, Ohio, or by anyone else, to applicants' knowledge.

One can only conclude, therefore, that such prior art devices have proven unsatisfactory in accomplishing effective mixing of such meat products for one reason or another, since there can be no dispute about the need of butchers for avoiding the time-consuming (and hence, expensive-from-a-labor standpoint) steps of hand-mixing the ground constituents and regrinding the resulting mixture.

The present invention effects a thorough mixing of the ground elements as they discharge seriatim, or with only slight mixing, through the perforated plate of the conventional screw-type motor driven grinding machine. This mixing is accomplished by means of a novel rotating mixing and impeller unit or assembly, including a shaft extension which is coupled to the outer extremity of the rotating grinding machine shaft, to rotate therewith. A series of helically disposed blades of decreasing radii, a further screw and a final cutter blade, coaxially and fixedly mounted upon the shaft extension to turn with the latter within a special housing, serve first, thoroughly to mix the several constituents, and, then, to force them under pressure into the worm conveyor and grinding portion of the assembly for discharge through a second rotating cutter blade and a final fixed perforated plate. The special housing preferably defines a chamber of two sections: one in the form of a frustum of a cone, with its base disposed adjacent to, and coaxial with, the grinder outlet, and its most restricted cross-section coinciding with the beginning of the second section, which is a cylindrically shaped passage within which the worm conveyor grinding portion of the assembly rotates. By spacing the several helically oriented blades from each other, the ingredients do not move directly from the inlet to the outlet of the chamber, but are caused to mix in and around each blade until, by the build-up of pressure in the conical portion of the chamber, the mixed ingredients are impelled into the intake of the worm conveyor grinder for final grinding and passage through another rotating cutter blade and ultimate discharge through a second perforated plate.

The housing itself is adapted to be coupled onto the discharge extremity of the grinder housing, thereby to receive directly the meat and fat elements discharged from the perforated plate of the grinder. Optionally, the housing may be provided with means to refrigerate itself and the mixed elements which pass therethrough, or which may be left in the housing between different grinding and mixing operations in the butcher shop.

The present invention may be more fully understood from the following detailed description of the preferred embodiment thereof and with reference to the accompanying drawings in which, FIGURE 1 is a perspective view showing the device of the present invention attached to the discharge end of a conventional motor driven meat grinding machine.

FIGURE 2 is a view partly in section and partly in side elevation, showing the rotating assembly of the present invention as it is disposed in the chamber and attached to the shaft extremity of the meat grinding machine;

FIGURE 3 is a side elevation similar to that of FIGURE 2, but showing the passage of the ground meat constituents through the chamber;

FIGURE 4 is a perspective view of a portion of the housing and an adapter element showing an interlocking arrangement for securing the housing and adapter in fixed engagement;

FIGURE 5 is a plan view of the interlocking arrangement shown in FIGURE 4;

FIGURE 6 is an elevation view of a small orificed discharge plate for the mixing attachment; and FIGURE 7 is a similar view of a larger orificed discharge plate which may be attached to the grinder.

A conveniotnal motor driven meat grinder is disclosed in FIGURE 1 and consists of a hopper 10 through which meat and suet elements 12 may be fed into a worm conveyor type grinder 14 (FIGURE 2), which is housed in the barrel-like extension 16 of the motor housing 18. The ground meat elements are impelled by the worm conveyor type grinder 14 toward the discharge area 20 of the barrel-like extension 16, where they are intercepted by the rotating cutter blade 22 and then forced through the orificed plate 24, which is secured over the outlet of the housing 16. This plate 24 also serves to journal the extremity 26 of the grinding machine shaft upon which the worm conveyor type grinder 14 is fixedly mounted to rotate therewith. The present invention is particularly designed for attachment to the discharge end of such grinding machine in the manner shown in FIGURE 2. The device preferably comprises a barrel-like housing 28 which is supported in part by a member 30. A cylindrical adapter piece 32 may be provided for threaded engagement with the outer end of the barrel-like extension 16. A mixing and impeller unit 34 is provided and constructed as follows:

A shaft 36, having an inner end diameter slightly larger than the diameter of the extremity 26 of the grinder shaft is provided for coupling engagement with the latter. In the embodiment shown in FIGURE 2, this coupling is accomplished by a male-female engagement secured by a cotter pin or other transverse element 38. Mounted upon the shaft 36 are a series of helically oriented mixing blades 40, 42 and 44, each being spaced from each other on the shaft and of a diameter slightly less than the inner diameter of the area of the conical section 46 of the chamber 48, which is defined by the barrel-like housing 28. Following the series of blades 40, 42 and 44 is a scoop-up blade 51, which is secured to the beginning of a worm conveyor 52. Following the worm conveyor 52 is a further cutter blade 54. Each of the blades 40, 42, 44 and 50, the worm conveyor 52, and the cutter blade 54, is fixedly secured to the shaft 36 to comprise the rotating mixing and impeller unit or assembly 34.

As may be seen from FIGURES 2 and 3, the housing 28 preferably defines a chamber 48, which is constituted of two sections, namely, a first conical section 46, which is in the shape of a frustum of a cone, having its base 58 in proximity to the outlet of the grinding machine; and the second section 60, which is cylindrical in shape. Both of these sections 46 and 60 are disposed coaxially and preferably coaxially with the barrel-like extension 16 of the grinding machine.

The blade portion of the rotating assembly 34, which comprises the shaft 36 and the helically oriented blades 40, 42, 44 and 50, rotate within the conical section 46 of the chamber 48. As appears from FIGURE 2, each of the blades 42, 44 and 50 is necessarily of a smaller radii than the blade which precedes it in order to the able to rotate within the conical portion 46 of the chamber 48. The worm conveyor 52, however, may be of a uniform maximum diameter since it revolves in the cylindrical section 60 of the chamber 48.

The housing 28 is provided at its discharge end with an annular flange 62 which may be externally threaded at 64 in order to receive a clamping element 66. This clamping element may be employed to position securely a perforated plate 68. The latter may be centrally orificed at 70 to receive and journal the extremity 72 of the shaft 36 in order to maintain proper alignment of the mixing and impeller unit 34 within the chamber 48. The clamping element 66 may be provided with an arm 74 in order to facilitate threading of this member onto the flange 62.

Attachment of the housing 28 to the adapter piece 32 is accomplished by the bayonet-type locking engagement which is best illustrated in FIGURES 4 and 5. As there shown, the adapter piece 32 is provided with a slot 76 which is wide enough to permit the insertion of a boss member 78, one end of which is secured by screws 80 in a recess 82 in the forward edge 39 of the housing 28. The boss member 78 is provided with an extending foot 84 and the slot 76 is recessed at 86 in such a manner as to be adapted to receive the foot 84 when the housing 28 is slightly rotated counter-clockwise (when viewed from a direction facing the abutting face of the adapter piece 32). To enable the housing 28 to be secured fixedly to the adapter piece 32, the latter is provided with a slot extension 88 in which is slidingly mounted a filler piece 90 by means of a screw 92 passed through a slot 94. The filler piece 90 is slideable for a distance equal to the length of the slot 94 in the direction of the arrow 96.

If desired, the housing 28 may be constructed as illustrated in FIGURE 3 to incorporate a helical passage 98 through which a refrigerant, not shown, may be passed, in order to chill the housing 28a. Such a passage 98 may be provided by a coil of copper tubing 100 which is wrapped around a recessed portion 102 of the housing 28a. A cylindrical metallic cover sheet 104 may then be provided to encircle the recessed portion 102 and the copper coils 100 set in such recessed portion, this cover sheet being secured to the ends of the housing 28a by screws 106. Suitable orifices 108 and 110 may be provided in this sheet 104 to permit a hose or other conduit (not shown) to be connected to the tubing 100 to deliver the refrigerant to one end thereof and to remove the same therefrom, respectively.

In use, the adapter piece 32 is first threaded on to the matingly threaded end of the barrel-like extension of the grinder 16. The mixing and impeller unit or assembly 34 is then coupled to the extremity of the grinder shaft 26, after which the barrel-like housing 28 is placed over the mixing and impeller unit 34 until the end 39 of the housing 28 abuts the outwardly facing side 33 of the adapter piece 32 with the boss member 78 inserted in the slot 76. Thereupon the barrel-like housing 28 is slightly rotated until the foot 84 of the boss member 78 moves into the recess 86 to engage the same. The filler piece 90 is then moved in the direction of the arrow 96 until it is seated in the manner shown in FIGURE 4. The screw 92 may thereupon be tightened to prevent the filler piece 90 from sliding back in an axial direction and thereby permit the boss member 78 to be disengaged from the recess 86.

The perforated plate 68 is then inserted in the annular flange extension 62 of the housing 28 and the end 72 of the shaft 34 is passed through the orifice 70, and journaled in such orifice. Lastly, the clamping member 66 is threaded on to the external threading 64 of the annular flange extension 62 to hold the plate 68 tightly within the flange extension 62 of the housing 28. In aligning the housing 28, it will be observed from FIGURE 1 that the housing is brought over, and supported by, the element 30.

The device is then ready for operation. Meat, suet and other elements may be fed into the hopper 10 of the grinding machine where they are first ground up in the conventional manner and discharged through the rotating cutter blade 22 and the orificed plate 24 of the grinding machine. As these elements are discharged from the grinder, they first build up in the lower portion of the conical section 46 of the chamber 48. As the build-up occurs, these elements are first picked up by the blade 40 and impelled forward into the space 56, between the blades 40 and 42. There, some of the elements will be picked up by the leading edge 43 of the blade 42 and other portions may actually be returned to the base of the conical section 46. As different elements are discharged from the grinder, substantial mixing action thus begins to occur in and about the blade 40. Further mixing is similarly arcomplished between and about the blades 42 and 44. Actually, it will be found that the mixed meat elements advance past the blade 42 only as there is a pressure build-up occurring in the portions of the conical section 46 of the chamber 48. This pressure build-up does not occur until after vigorous mixing action has been accomplished in the chamber areas rotatingly traversed by the blades 40, 42 and 44. As the pressure build-up occurs, the mixed elements are ultimately picked up by the leading edge 51 of the scoop-up blade 50 for a final mixing and depositing in the leading turn 53 of the worm conveyor grinder 52. At this point a final grinding and conveying action occurs with a depositing of the mixed ingredients in the discharge end 55 of the cylindrical portion 60 of the chamber 48, where the mixed ingredients are further cut by the rotating cutter blade 54 and discharged through the perforated plate 68 in a manner similar to the cutting and discharging action which occurs in the grinding machine.

By providing perforated plates 24 and 68 of different size orifices, the nature of the finally mixed product may be varied. For example, if the plate 68 is provided with large perforations, the resulting product will be of a coarser conglomerate such as is ordinarily found in sausage. On the other hand, if plate 68 is provided with perforations of very small diameters, the resulting product may more nearly have the fineness of a wurst.

Desirably, the meat should be ground in a room of low temperature, since it will be found at the conclusion of any particular grinding operation that ingredients in various stages of mix will adhere to the parts of the mixing and impeller assembly until additional discharge occurs from the grinding machine, in order to provide pressure behind the adhering mixture. Thus, if, at the conclusion of a grinding operation, the housing is removed from the unit 34, meat elements in various stages of mixing will be found to be molded about the shaft, blades and convolutions of the worm conveyor 34 in a form corresponding with the shape of the inner walls of the housing 28. Desirably these meat elements should then be removed from the mixing and impeller unit 34 by hand. However, if the grinding and mixing operation is conducted in a cold room, they may be left within the housing for a reasonable period of time. Likewise, if the housing is provided with the refrigerating system shown in FIGURE 3, and the housing is thereby kept at a very low temperature, the meat may be left within the housing for several days.

While the mixing and impeller unit or assembly 34 is shown in FIGURE 2 to be provided with four blades, namely, 40, 42, 44 and 50, three or possibly even two blades may be found to be sufficient to provide adequate mixing. However, the unit as shown in FIGURE 2 has been found to provide extremely effective mixing and conveyor action.

While the unit has been described with particular application to the mixing of ingredients for the manufacturer of hamburger, sausage and wursts, it is obvious that it may have application also to the mixing of other plastically workable ingredients, and the present invention is not to be deemed limited to an attachment for a meat grinding machine. Other variations of the basic teaching will readily occur to those skilled in the art, but all of these variations are intended to be comprehended within the scope of the invention disclosed and hereafter claimed.

We claim:
1. A device for mixing a plurality of plastically workable ingredients fed into said device into a relative homogeneous conglomerate, said device comprising:
   (A) a housing defining a chamber, said chamber
      (1) having an intake area,
      (2) having an outlet area, said outlet area being disposed remotely from the intake area; and
      (3) being constituted of:
         (a) a first section in the form of the frustum of a cone with its base at the intake area, and
         (b) a second section in the form of a cylinder coaxial with the first section and extending from the vertex of the first section toward the outlet area;
   (B) a mixing and impeller unit, said unit
      (1) being rotatable about an axis substantially coinciding with the axis of said two chamber sections, and extending through said two sections substantially from the inlet area to the outlet area; and
      (2) including a plurality of means disposed about said unit axis, each of said means being:
         (a) adapted to impel the ingredients through the chamber in a direction from the inlet area to the outlet area upon rotation of said unit relative to the chamber;
         (b) of a generally helical configuration and of an outer radius substantially equal to the inner radius of the cross-section of housing most proximate to the particular one of said means, thereby to provide a degree of forward impulsion to any ingredients contacted by said means, upon rotation of the last said means relative to said chamber; and
      (3) at least the one of said impelling means nearer the outlet area being a worm conveyor spaced from other impelling means nearer the intake area, whereby effective mixing occurs in that part of the chamber which precedes, in order of passage of the ingredients beyond the outlet means, the worm conveyor.

2. A device for mixing meat ingredients into hamburger, sausage and similar type meat products, said device being adapted for attachment to the discharging end of a power driven meat grinding machine of the type which effects discharge of ground-up ingredients through a circular perforated plate by means of a worm conveyor grinder disposed on a rotating shaft, one end of which shaft is journalled in said plate and protrudes therethrough, said device comprising:
   (A) a barrel-shaped housing, said housing
      (1) being provided with means to couple it to said discharging end of the meat grinding machine, and
      (2) defining a chamber, said chamber having
         (a) an intake area disposed to receive the discharge from the grinding machine,
         (b) an outlet area disposed remotely from the said intake area,
         (c) substantially circular coaxial cross-sections between said intake and said outlet areas, and said cross-sections being substantially coaxial with the discharging end of the said grinding machine;
      (3) the walls of said chamber defining a first section shaped as the frustum of a cone, with its base substantially coaxial with and adjacent to the discharging side of said perforated plate when the housing is coupled to the end of said machine, and a second section which is substantially cylindrical in shape and coaxial with the first section; and
   (B) a mixing and impeller unit, said unit
      (1) including a shaft connectable to the said protruding end of the shaft of the grinding machine, to rotate therewith, and as an extension thereof;
      (2) having a plurality of means fixedly disposed on said shaft to rotate therewith, each of said means being
         (a) adapted to impel the ingredients through the chamber in a direction from the inlet area to the outlet area upon rotation of said unit relative to the chamber;
         (b) of a generally helical configuration and of an outer radius substantially equal to the inner radius of the cross-section of housing most proximate to the particular one of said means, thereby to provide a degree of forward impulsion to any ingredients contacted by said means, upon rotation of the last said means relative to said chamber; and
      (3) at least the one of said impelling means nearer the intake area being spaced from other impelling means nearer the outlet area, whereby effective mixing occurs in that part of the chamber which precedes, in order of passage of the ingredients toward the outlet area, the latter impelling means.

3. The device as described in claim 2 wherein the one of said impelling means nearest the outlet area is a worm conveyor grinder.

4. A device for mixing meat ingredients into hamburger, sausage and similar type meat products, said device being adapted for attachment to the discharging end of a power driven meat grinding machine of the type which effects discharge of ground-up ingredients through a circular perforated plate by means of a worm conveyor grinder disposed on a rotating shaft, one end of which shaft in journalled in said plate and protrudes therethrough, said device comprising:

(A) a barrel-shaped housing, said housing
  (1) being provided with means to couple it to said discharging end of the meat grinding machine,
  (2) defining a chamber, said chamber having
    (a) an intake area disposed to receive the discharge from the grinding machine,
    (b) an outlet area disposed remotely from the said intake area,
    (c) substantially circular coaxial cross-sections between said intake and said outlet areas, and said cross-sections being substantially coaxial with the discharging end of the said grinding machine
  (3) the walls of said chamber defining a first section shaped as the frustum of a cone, with its base substantially coaxial with and adjacent to the discharging side of said perforated plate when the housing is coupled to the end of said machine, and a second section which is substantially cylindrical in shape and coaxial with the first section; and (B) a mixing and impeller unit, said unit
  (1) including a shaft connectable to the said protruding end of the shaft of the grinding machine, to rotate therewith, and as an extension thereof;
  (2) having a plurality of means fixedly disposed on said shaft to rotate therewith, each of said means being:
    (a) adapted to impel the ingredients through the chamber in a direction from the inlet area to the outlet area upon rotation of said unit relative to the chamber;
    (b) of a generally helical configuration and of an outer radius substantially equal to the inner radius of the cross-section of housing most proximate to the particular one of said means, thereby to provide a degree of forward impulsion to any ingredients contacted by said means, upon rotation of the last said means relative to said chamber; and
  (3) at least the one of said impelling means nearer the intake area being spaced from other impelling means nearer the outlet area, whereby effective mixing occurs in that part of the chamber which precedes, in order to passage of the ingredients toward the outlet area, the latter impelling means; and (C) a perforated plate, said plate:
  (1) covering said outlet area and through the perforations of which latter plate the mixed ingredients are discharged; and
  (2) having a further orifice in which the end of the unit shaft may be journalled for rotation therein.

5. The device as described in claim 2, wherein the one of said impelling means nearest the outlet area is a worm conveyor grinder and the other impeller means fixedly disposed on said shaft to rotate therewith comprises at least two helical blade sections spaced from each other and disposed more remotely from the outlet area than the worm conveyor.

References Cited

UNITED STATES PATENTS

| | | | |
|---|---|---|---|
| 1,831,779 | 11/1931 | MacDonald. | |
| 2,050,758 | 8/1936 | Long | 146—187 |
| 2,434,690 | 1/1948 | Ferla | 18—12 |
| 2,505,125 | 4/1950 | List | 18—12 |
| 2,538,465 | 1/1951 | Marco | 259—97 |
| 2,626,132 | 1/1953 | Reed | 259—97 X |
| 2,693,835 | 11/1954 | Lundell | 146—182 |

WILLIAM W. DYER, JR., *Primary Examiner.*

W. GRAYDON ABERCROMBIE, *Examiner.*